United States Patent
Tucholski

[11] 3,884,722
[45] May 20, 1975

[54] ALKALINE GALVANIC CELLS

[75] Inventor: Gary Ronald Tucholski, Parma, Ohio

[73] Assignee: Union Carbide Corporation, New York, N.Y.

[22] Filed: Mar. 18, 1974

[21] Appl. No.: 452,131

[52] U.S. Cl. ............... 136/102; 136/107; 136/125; 136/178
[51] Int. Cl. .......................... H01m 17/00
[58] Field of Search .......... 136/102, 107, 125, 126, 136/120 R, 120 FC, 30, 178, 138, 133, 157; 220/44

[56] References Cited
UNITED STATES PATENTS

| | | | |
|---|---|---|---|
| 2,859,266 | 11/1958 | Garvey et al. | 136/157 X |
| 3,018,316 | 1/1962 | Higgins et al. | 136/157 X |
| 3,293,081 | 12/1966 | Daley | 136/178 |
| 3,463,669 | 8/1969 | Jammet | 136/107 X |
| 3,741,813 | 6/1973 | Bergum et al. | 136/107 |

Primary Examiner—Anthony Skapars
Attorney, Agent, or Firm—Clement J. Vicari

[57] ABSTRACT

An improved alkaline galvanic cell containing a resealable venting valve to permit gas release from the cell, a liquid impermeable gas permeable membrane associated therewith and an improved composite anode which does not entrap gas therein.

29 Claims, 5 Drawing Figures 3,884,722

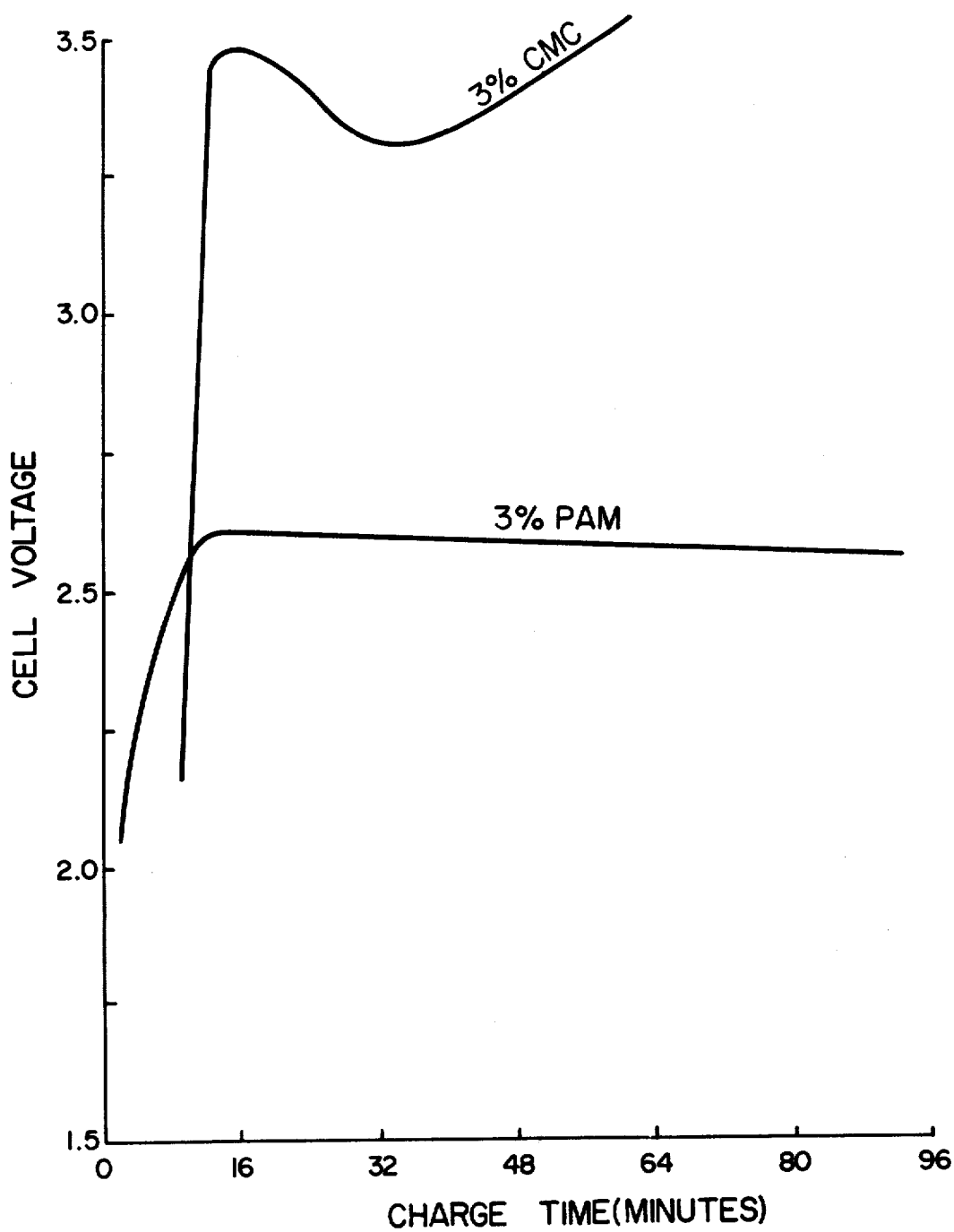
F I G. 5

3,884,722

ALKALINE GALVANIC CELLS

The present invention relates to improved alkaline galvanic cells and more particularly to an improved alkaline-zinc-manganese dioxide cell which is characterized by a high degree of resistance towards leakage, bulging or possible rupture of the cell.

Alkaline galvanic cells may generate large quantities of gas under certain conditions during use. Since these cells are required to be fluid-tightly sealed in order to prevent loss of electrolyte by leakage or evaporation, high internal gas pressures may develop. Such pressures may cause leakage, bulging or possible rupture of the cell if not properly vented. Especially, in the case of secondary or rechargeable cells, the vent must be resealable in order to avoid drying out of the electrolyte over the normally long life of the cells and to prevent ingress of oxygen and carbon dioxide.

In the past, several different types of resealable pressure relief vent valves have been used for releasing high internal gas pressures from inside a sealed alkaline galvanic cell. One type of resealable vent valve that has been commonly used consists basically of a valve member, such as a flat rubber gasket, which is biased into sealing position over a vent orifice by means of a resilient member such as a helical spring. The resilient member or spring is set to yield at a certain predetermined internal gas pressure momentarily breaking the seal and allowing the gas to escape through the vent orifice.

Another type of resealable pressure relief vent valve that has been tried is that disclosed and claimed in U.S. Pat. No. 3,293,081 issued to J. L. S. Daley on Dec. 20, 1966. This resealable vent valve basically includes an annular seal gasket such as an O-ring which is maintained in sealing position around the periphery of the vent orifice by means of an arc-shaped resilient member or spring. The resilient member or spring is set to yield and permit radial movement of the seal gasket momentarily breaking the seal and allowing the passage of gas through the vent orifice when a predetermined high internal gas pressure is reached inside the cell.

More recently, U.S. Pat. No. 3,664,878 describes a resealable pressure relief vent valve for releasing gas from inside a galvanic cell by utilizing a resilient deformable ball of a suitable elastomeric material which is positioned to overlie a vent orifice provided within the cell. A retainer means is positioned over the resilient ball for maintaining the ball in place over the vent orifice and in contact with a valve seat provided around the peripheral edge portions of the vent orifice and for compressing and deforming the resilient ball into a flattened configuration forming a normally fluid-tight seal between the flattened ball and the valve seat. Various other resealable pressure relief venting valve systems are known to the art, each having as its primary purpose the release of high internal gas pressures inside the cell container.

As is known to those skilled in the art, the conventional resealable pressure relief vent valve structures have been highly effective in ameliorating the problems incident to pressure build-up within a cell, particularly an alkaline cell, where excessive pressure buildup can be hazardous. Unfortunately however, problems still exist with the known type resealable pressure relief venting valve structures due to electrolyte creepage and to the fact that some liquid in the form of electrolyte or the reaction product of the electrolyte with other chemical ingredients accompanies the gas passing through the vent orifice and venting valve. This liquid causes "crusting" on the valve seat thereby preventing adequate resealing of the vent valve after pressure has been released from the cell container. After a period of time, electrolyte escapes from the cell through the improperly seated vent valve.

Another problem incident to conventional alkaline galvanic cells is the problem dealing with anode expansion. Conventional alkaline primary and secondary cell construction utilizes a zinc anode, a cathode of a depolarizer material including an electrolytically reducible oxygen yielding compound and an alkaline electrolyte such as an aqueous solution of an alkali metal hydroxide immobilized against free flow by means of a compatible gel. Merely as illustrative, U.S. Pat. No. 2,593,893, issued Apr. 22, 1952 to Bernard H. King, discloses a primary cell construction utilizing a composite anode and electrolyte member consisting of a substantially solid self-supporting body composed throughout of a uniform mixture of anode metal particles, the electrolyte, and a compatible gelling agent. The particular gelling agent disclosed in the patent to King is sodium carboxymethyl cellulose, the conductivity of which is provided by the absorbed electrolyte.

The use of carboxymethyl cellulose, or its derivatives, as the binder and gelling agent for anode construction, has been generally satisfactory from a practical commercial standpoint. Unfortunately however, when conventional alkaline cells generate gas (abuse charge, post discharge and on shelf), the gas is often entrapped in the anode. This entrapped gas causes the anode to swell and the internal cell pressure to rise. Eventually, cell rupture or leakage will occur.

The known methods involving the utilization of the aforementioned type venting valves or structures for gas release become less effective because the swollen anode blocks the venting orifice thereby entrapping the gas in the cell.

Accordingly, it is an object of the present invention to provide a novel and improved alkaline galvanic cell which exhibits a high degree of resistance towards leakage, bulging and possible rupture of the cell.

Another object is to provide an alkaline-zinc-manganese dioxide cell which may be abuse charged at reasonable rates without serious detrimental effects.

Another object is to provide an alkaline-zinc-manganese dioxide cell wherein gas can be released from the cell without releasing any liquid in the form of electrolyte from the cell.

These and others objects will become apparent from the following description of the invention taken in conjunction with the accompanying drawings in which:

FIGS. 4 and 5 are graphs showing performance data of the composite anode structure to be employed in the novel cell.

In accordance with the present invention, there is provided an alkaline galvanic cell which comprises, in combination a cell container, an anode chamber and a cell closure for said cell container, venting means including a venting orifice in said closure defining a conduit for the passage of gas from said anode chamber, said venting orifice having a top portion and a bottom portion, a pressure movable resealable venting valve member biased into sealing position on the top portion of said orifice and a gas permeable liquid impermeable membrane disposed on the bottom portion of said venting orifice, said anode chamber including a composite anode containing zinc particles, an alkaline electrolyte and a cross-linked polyacrylamide, wherein said alkaline electrolyte is absorbed in said cross-linked polyacrylamide to form electrolyte nuggets ans wherein said zinc particles are electrolyte-wetted and are distributed throughout said composite anode in a manner such that said zinc particles are in contacting relation with said electrolyte nuggets and with each other.

Figure 1:
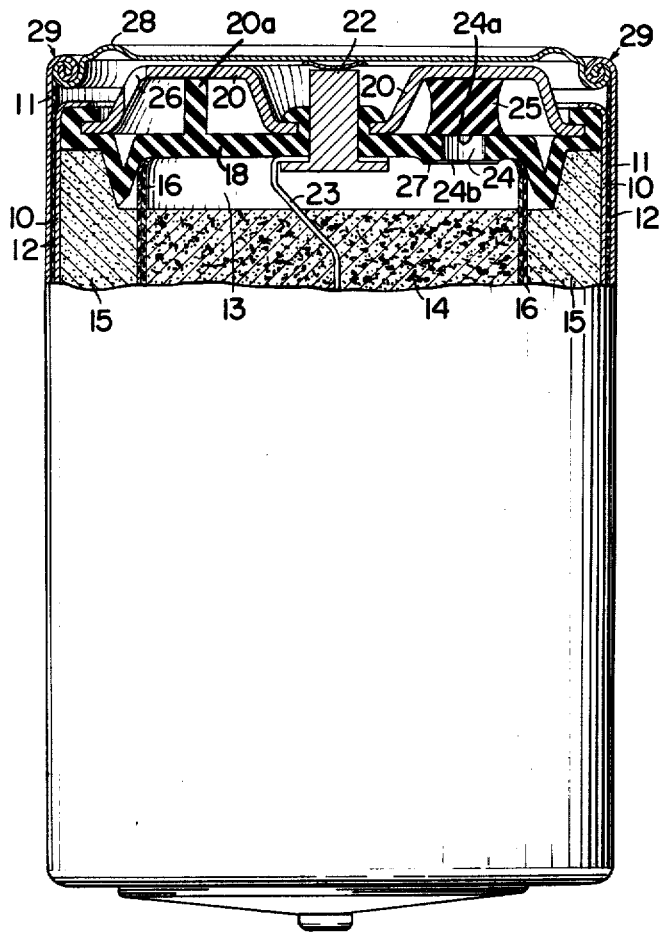
FIG. 1 represents a front elevation, partially in section of one embodiment of the cell of the present invention.

Referring now to FIG. 1 of the drawings, there is shown an alkaline galvanic cell utilizing one type of gas pressure relief vent means. The cell comprises a container 10 provided with an outer metallic jacket 11 separated from the container 10 by an insulating liner 12 suitably of paper or other fibrous material. Disposed within the container 10 is an anode chamber 13 containing an anode 14, a tubular cathode 15 and an alkaline electrolyte dispersed therethrough such as an aqueous solution of potassium hydroxide or sodium hydroxide. The cathode 15 is juxtaposed in contact with the side walls of the container 10 but is separated from the anode chamber 13 by a liquid and gas permeable, electrolyte-containing separator medium 16. The separator medium 16 may be composed of two juxtaposed layers of separator material placed between the anode chamber 13 and cathode 15 and underlying the upper closed end of the container 10.

The positively polarized container 10 is sealed at its open end by an annular shaped seal gasket 18, an unpolarized vented metallic cover 20 which resides in said gasket and which is partially supported by horseshoe support 20a, and a negatively polarized centrally located terminal member 22 which is in contact with an anode current collector 23 contacting anode 14. The seal gasket 18 is provided with a venting orifice 24 having a top portion 24a and a bottom portion 24b which defines a passage for the release of gas from the anode chamber 13 generated therein. A valve member 25, such as a valve disc is disposed between the cover 20 and the venting orifice 24 in fluid tight relation with the venting orifice.

The resilient valve member employed according to the invention must be substantially inert to the chemical ingredients of the cell, and must be of a diameter in excess of the diameter of the vent orifice. In addition, the valve member should be pressure movable or deformable so that when the internal pressure in the anode chamber reaches the minimum venting level, the gas can be released through the vent orifice 24.

I have found that a valve member such as a disc fabricated from ethylene propylene rubber, or from neoprene and having a material hardness of about 30-80 durometer, is particularly suitable for the present invention. When the valve member 25 is in the form of a valve disc as shown in FIG. 1, the size and shape of the valve disc would of course depend upon the cell size, but in general, I prefer a flat circular disc or washer of sufficient height so that when in compressed position in the cell, the restraining force exerted by the cover 20 on the valve disc is sufficient to keep the disc biased against the vent orifice resulting in a fluid tight relationship.

When gas pressure builds up to a predetermined level in the anode chamber 13, the valve member 25 is urged towards the metallic cover 20 permitting gas to pass through the vent orifice 24 whereby it passes through cover opening 26 thence out of the cell where the top cover plate 28, and outer metallic jacket, meet at 29. Upon the release of the gas from the anode chamber 13, the valve member or valve disc, due to its resiliency and the urging of the cover 20, again covers the vent orifice 24 in fluid tight relationship. As mentioned previously, in conventional cells some of the electrolyte or reaction product thereof together with gas will pass through the vent orifice 24 and consequently some of this electrolyte will deposit on the top portion of the vent orifice. This electrolyte material is subject to "crusting" and seriously interferes with the reseating of the valve member 25 and resealing of the vent orifice 24. According to the present invention, a hydrophobic membrane 27 is provided in the anode chamber 13 between the composite anode and the venting orifice 24 and is positioned on the bottom portion 24b of the venting orifice 24. The membrane 27 can be fastened to the gasket by any suitable conventional means such as by heating (fusion bonding) by use of an adhesive, by mechanical means or by any combination of the above.

The hydrophobic membrane which can be employed according to the present invention can be fabricated from a wide variety of materials known to the art. Merely as illustrative, the membrane can be fabricated from materials such as polyethylene, polypropylene and perhalogenated aliphatic hydrocarbons such as polytetrafluoroethylene or polytrifluoromonochloroethylene. The important criteria for selecting a suitable membrane is that it be microporous, chemically resistant, and capable of being permeable to the gases and impermeable to the liquids present in a cell.

For greatest protection, the membrane should preferably have a hydrogen gas permeability flow rate at 20° Centigrade of at least about 20,000 preferably about 40,000 to 75,000 and most preferably about 50,000 cc per hour per square inch at a differential pressure of 30 psi. Liquid penetration pressure, i.e., the internal pressure differential required in the cell to force electrolyte liquid through the membrane, should be preferably greater than about 300 psi. In the event that the pores of the membrane plugged or otherwise blocked, the membrane should have a burst strength in the cell below the rupture point. As is well known, various cell sizes have various rupture pressure points. Thus, for "D" size cells the burst strength of the membrane should be about 400 to about 500 psi. For "AA" cells the burst strength should be about 800 to 1,000 psi. If necessary, a support layer having an open mesh construction can be utilized with the membrane if the membrane lacks the required burst strength. The membrane can be laminated to the support layer so as to form an integral part thereof. Membranes which can be employed according to the present invention are available commercially under the following trademarks:

"Zitex" — a porous "Teflon" membrane available from Chemplast, Inc., Wayne, N.J.;

"Poroflex" — a porous "Teflon" membrane available from Delectric Corp., Farmingdale, N.Y.;

"Gore-Tex" — a porous "Teflon" membrane available from W. L. Gore & Associates, Inc., Newark, Del.; and "Celgard" — a porous polypropylene membrane available from Celanese Plastics Co., Newark, N.J.

Figure 2:
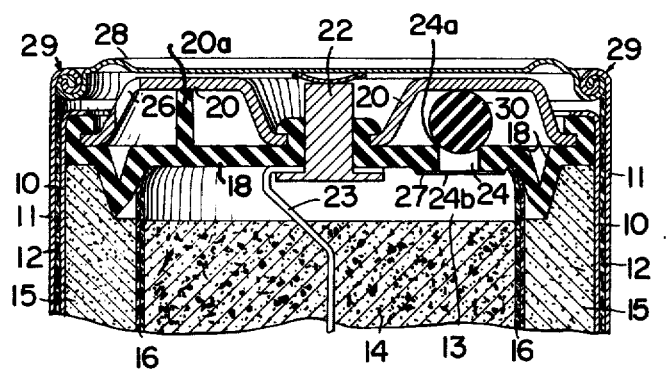
FIG. 2 is a fragmentary sectional view of another type of gas pressure relief venting structure which can be employed in the cell of FIG. 1.

Referring to FIG. 2, where and when possible like parts are designated by like reference numerals when compared with FIG. 1, it will be seen that the membrane 27 is combined with another type of venting means similar to that disclosed in U.S. Pat. No. 3,664,878 issued to Helmut K. Amthor on May 23, 1972. Thus, a resilient ball 30 preferably with a hardness of about 60 to 70 durometer is the valve member and is positioned and compressed between the cover 20 and the gasket 18 in a manner such that the passageway through the vent orifice 24 is sealed in a normally fluid-tight seal engagement around the peripheral edge portions of the vent orifice forming a valve seat.

The vent valve will remain closed, sealing off the vent orifice 24, until the internal gas pressure during use or discharge of the cell builds up to a predetermined value. When this predetermined gas pressure is reached, the ball 30 will be urged towards the top cover 20 and the ball will undergo temporary further deformation, momentarily breaking the seal around the peripheral edge portions of the vent orifice 24. This allows gas to escape from inside the cell as mentioned previously. the vent valve will remain open until the forces exerted against the ball by the internal gas pressure at less than the sealing forces exerted by the resilient stress of the ball whereupon the ball will again reseat against the top portion 24a of the vent orifice 24 and reseal the vent orifice.

The membrane may also be employed in conjunction with other known resealable vents such as the Daley O-ring type previously mentioned. The vent valve and membrane assembly, while most conveniently located in the cell closure, could be located in the container wall or bottom without loss of operability.

Figure 3:
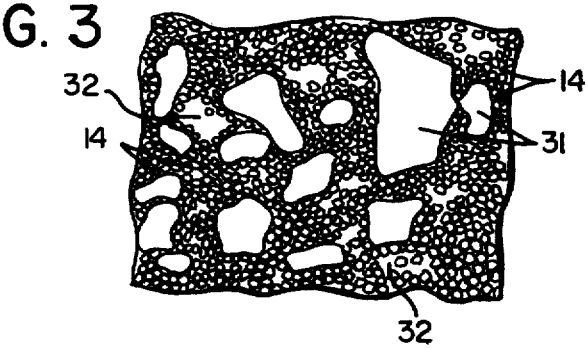
FIG. 3 is an enlarged view of a section of a composite anode shown in FIG. 1.

Referring now to FIG. 3, there is shown a composite anode containing wetted amalgamated zinc particles 14, distributed throughout the anode chamber 13, some of which coat or cover, in contacting relation, electrolyte nuggets 31.

It will be seen that the zinc particles 14 contact each other and that there exists a system of interconnectable voids 32 which appear throughout the composite anode structure. These voids which interconnect or may do so by slight movement of the nuggets serve to provide channels for the passage of gas thereby substantially precluding the formation of entrapped gas pockets in the anode chamber 13.

The zinc employed according to the present invention is preferably of the type commonly employed in this art, i.e., in the form of amalgamated zinc particles or powder. The particles prior to amalgamation have a size within the Tyler standard screen range of through 60 mesh but substantially retained on 325 mesh. They can be present in the anode in an amount of 30 to 85% by weight preferably 40 to 70% by weight based on the total weight of the ingredients in the anode chamber.

The electrolyte material is an aqueous alkaline metal hydroxide such as sodium hydroxide, potassium hydroxide and the like or mixtures thereof. Potassium hydroxide is preferred. The electrolyte material is present in the anode chamber in an amount of 10 to 65% by weight and preferably 25 to 55% by weight based on the total weight of the ingredients in the anode chamber.

In general, the cross-linked polyacrylamide or similar material employed according to the present invention must exhibit the following traits and characteristics:

a. be capable of absorbing the electrolyte and assuming after absorption an expanded or swollen condition;

b. be substantially insoluble in the electrolyte;

c. be stable at the temperatures of use, i.e., it should not release absorbed electrolyte or change physical form at temperatures of use;

d. be capable of absorbing a minimum of about twelve times its weight of electrolyte; and e. as electrolyte-swollen nuggets should not be gummy or sticky to any significant degree, i.e., there should be no gluing or cementing effect.

The dry substantially water-insoluble cross-linked polyacrylamide used in accordance with this invention is employed in particulate form such as in the form of granules. Advantageously, this form provides ample surface area for absorption of the electrolyte and permits the formation of discrete nuggets. There should be about 1 to 8 per cent by weight, preferably about 2 to 5 per cent by weight, of cross-linked polyacrylamide (based on the total weight of the anode materials) in the anode.

Water-insoluble particulate cross-linked polyacrylamide of the type herein contemplated are known materials, but their uses in the past have not been related to that herein contemplated, i.e., as an absorbent material in the anode structures, wherein the absorbent material maintains its particulate character as it imbibes and absorbs many times its weight of alkaline electrolyte and in doing so swells. As previously, indicated, the absorbent, water-insoluble, particulate cross-linked polyacrylamide contemplated herein is capable of absorbing at least about 12 (e.g., up to about 40) times its weight of electrolyte. In doing so each individual absorbent particle swells or enlarges to several times its initial size without destruction of its initial integrity. As the particulate, water-insoluble cross-linked polyacrylamide accepts liquid it substantially immobilizes the same therein, and the resulting particulate, liquid-swollen structure is termed "electrolyte nugget". The absorptive capacity is easily determined by an "equilibrium absorption test" in which a weighed quantity (0.5 gram) of cross-linked polyacrylamide powder is soaked for 24 hours in 20 cc of 45% KOH solution in a closed container held in an oven at 100°C. After cooling, the unabsorbed electrolyte is filtered off and measured. The weight of electrolyte absorbed is then readily calculated from the known density and volume of electrolyte. Probing of the product on the filter paper with a stirring rod readily discloses whether the desired non-tacky nuggets were formed.

The water-insoluble absorbent particles which are preferably used in accordance with the present invention are known materials, generally being a cross-linked polyacrylamide whose polymeric network has been cross-linked to introduce water-insolubility into the molecule. Suitable water-insoluble absorbent cross-linked polyacrylamides, in accordance with the invention have a minimum average molecular weight per cross-linkage of about 900 and a maximum molecular weight per cross-linkage of about 1,600. In general, the polyacrylamide is not soluble in the liquids contemplated for use, yet becomes flexible and swells as liquid is absorbed within its structure. As the particle swells it maintains the approximate shape and geometry it had before contact with liquid, but the dimensions therof are greatly enlarged to provide for the binding of the liquid absorbed therein.

For the present invention the cross-linked, water-insoluble particulate materials of the invention are not the equivalent of known natural soluble materials such as agar, karaya and the water-soluble gums (tragacanth, arabic, locust bean, and guar), or of synthetic hydrocolloids such as carboxymethyl cellulose and carboxyethyl cellulose. These soluble hydrocolloids servet to increase viscosity of aqueous liquids or form gels therewith, but in the presence of an added liquid excess or strong caustic lose their power to retain the viscosity they had previously achieved. In contrast, the cross-linked absorbent polyacrylamide within the anode of the invention swells upon absorption of aqueous caustic liquid and retains the absorbed liquid. Liquid taken into the swollen structure is retained well under the conditions encountered in use, and with any excess of liquid the discrete, separate, liquid-swollen particle entity maintains its maximum swollen form. Moreover, these materials by virtue of the proper selection of the amount of cross-linking agent and monomers, are substantially non-tacky. Their ionic conductance is provided by the absorbed liquid.

The polyacrylamide absorbent materials of the invention prior to cross-linking may suitably be compounds having the following structural formula:

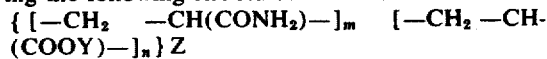

where

Y is hydrogen, ammonium or an alkali metal;

$m$ is a positive number from 1 to 100;

$n$ is 0, or a positive number up to 99 which may be regarded as an index of the degree of hydrolysis of $m + n$ amide groups originally present;

$m$ plus $n$ is equal to 100; and

Z is a number from about 0.1 to 30, where Z times 100 is equal to the number of mer units between cross-links.

The cross-linked polyacrylamide material of the invention may be prepared by known techniques, e.g., by cross-linking a linear polyacrylamide or preferably by copolymerizing an acrylamide monomer with a non-conjugated divinyl compound. Acrylic acid, methacrylic acid, or salts thereof may be employed with or in place of the acrylamide. The polymerization may be carried out by any of the standard methods including the use of peroxide catalysts, or by photo polymerization with riboflavin activator. The amount of cross-linking compound required to give the desired end product depends on the reactants employed and the conditions of reaction.

Examples of non-conjugated, divinyl cross-linking compounds are 1,4-divinyl benzene; N,N-diallylacrylamide; diallylamine; diallymethacrylamide; 2,5-dimethyl-1,7-octadiene; p,p'-diisopropenylbenzene; 2,8-dimethyl-1,8-nonadiene and diethylene glycol divinyl ether, divinyl sulfone, and methylene-bis-acrylamide.

In addition, as is well known in the art, the cross-linking may be accomplished by radiation techniques i.e., without the use of a cross-linking agent.

The preferred cross-linked polyacrylamides contemplated for use in alkaline galvanic cells, preferably alkaline-manganese dioxide-zinc system cells, are those which have been cross-linked with N,N'-methylene bisacrylamide. Most preferred are cross-linked polyacrylamides which have been formed by the copolymerization reaction of a ratio of 13 to 22 moles of acrylamide per mole of methylene bis acrylamide. A typical cross-linked material may be prepared in quantity according to the following process:

Dissolve with stirring (avoid incorporating air) 15.11 parts acrylamide monomer and 1.46 parts of N,N' methylene bis acrylamide in 83.28 parts (by weight) of water. This dissolve 0.07 parts of N,N,N',N' tetramethylenediamine with continued stirring and finally add 0.08 parts of ammonium persulfate. Continue stirring for 30 to 60 seconds following last addition. Then pour the solution into convenient size molds (e.g. 20 by 12 by 6 inches high). The solution will set up to a firm gel within 10 minutes, after which the cast blocks may be transferred to a chopper or shredder and broken up into discrete particles about 3/16 of an inch in diameter. These may be air dried by any convenient method at about 70°C. or somewhat above until the particles shrink and become hard and brittle. They may then be ground to a size of 1,000 microns or less and stored for use.

The anode of the present invention may be suitably made by a variety of techniques. In one such technique a heated mixer is utilized and is practiced in the following manner:

Technique A (External Method)

1. weigh the amount of zinc powder desired;
2. weigh the amount of mercuric oxide powder desired; (HgO is added so as to amalgamate the zinc powder)
3. mix 1 and 2 above with all or a major portion of the electrolyte which allows the zinc to be amalgamated;
4. weigh the polyacrylamide powder and add to 3 above; add ZnO powder here, if used;
5. heat the mixture to about 95°C. with agitation;
6. after the electrolyte is absorbed add the balance if any of the electrolyte;
7. after absorption of the electrolyte in the cross-linked polyacrylamide and by the zinc powder, the heat is discontinued and the mixture cooled while continuing the agitation; and
8. when the mixture is cooled it can be dispensed into the anode chamber of the cell by conventional means, such as by utilization of an auger type dispenser.

In another technique, the anode is fabricated according to the following procedure:

Technique B (Internal Method)

1. mix all the dry ingredients of the anode together;
2. mold by compression anode cylinders to a specific weight — dry basis (some moisture may be necessary for improved molding);
3. wet the separator of the cell;
4. place the anode cylinder in the cell;
5. add the correct amount of electrolyte; and
6. "cook", i.e., heat, the cell at about 95°C. until the electrolyte is absorbed.

It will, of course, be understood that various other techniques can be employed for preparing the anode structures of the present invention and that the manner of mixing as described in Techniques A and B above can be altered without appreciably changing the resultant product.

By virtue of the anode structure in the novel cell of the present invention, the composite anode is subject to very little expansion during abuse charge conditions.

Figure 4:
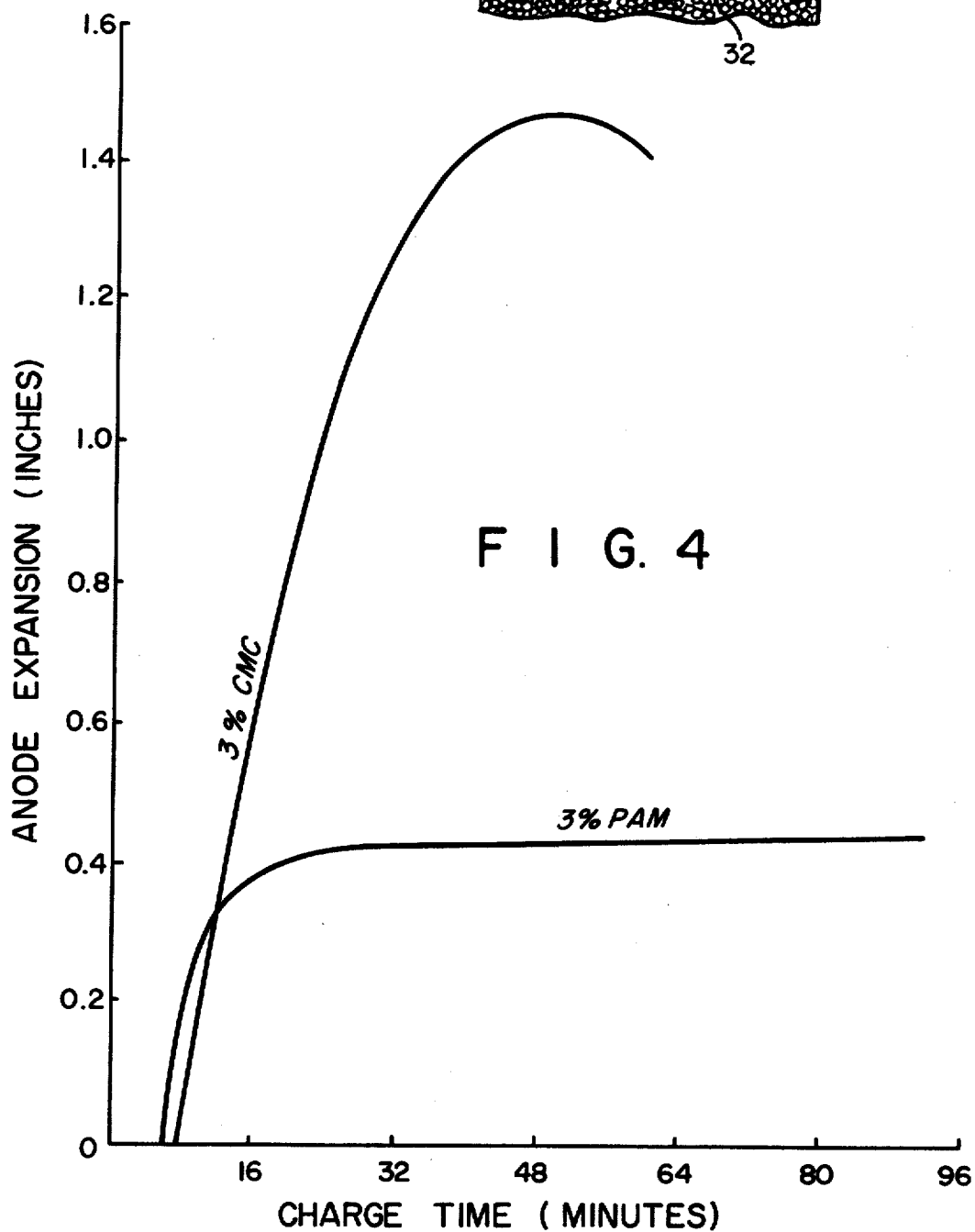

FIG. 4 shows the results of an anode expansion test under abuse charge conditions and compares a conventional anode containing carboxymethyl cellulose with the anode of the present invention.

An apparatus was used for the test which included a conventional alkaline-manganese dioxide-zinc cell except that a transparent plastic tube was inserted into the can in place of the seal which normally seals the cell. The tube had the same inside diameter of the anode chamber of the cell and extended above the upper part of the cell thereby serving as a container for the expanding anode. The amount of expansion was determined in the following manner;

a. the distance between the top of the anode and top of the cylinder before charging was measured, and was referenced as the zero point;

b. after charging started, the new distance between the top of the anode and the top of the cylinder was periodically measured. When this distance was subtracted from the zero point of (a) above the anode expansion was determined.

The anode mixture had the following formulation:
45.8 per cent zinc particles
1.8 per cent HgO powder
3.0 per cent polyacrylamide granules
49.4 per cent of 35 per cent concentration KOH solution in water The above percentages are by weight. The separator was pre-wet with 4 cc of the KOH electrolyte.

The polyacrylamide utilized was made by the copolymerization of acrylamide with methylene bis acrylamide by the preferred method previously described.

For comparative purposes the control cell anode had the same formulation as the above except that carboxymethyl cellulose was substituted for the cross-linked polyacrylamide. The auger dispenser was used in both cases.

The negative terminal of a direct current power supply source was connected to the brass current collector for the anode in each cell and the circuit through the cell completed by connecting the positive terminal to the container. 1000 milliamperes (MA) charge was given to each cell over a period of about 90 minutes or until the cell shorted out, at which point no more gas was generated.

The anode expansion was determined and the results are indicated in FIG. 4.

As will be seen from FIG. 4, heavy abuse charging resulted in low anode expansion of the polyacrylamide anode mixture. This means that commercial cells containing the novel anode structure can withstand field abuse charging (which is well below 1000 milliamperes) without any appreciable leakage. This may occur in a five cell flashlight, for example, with one cell inserted backwards. The results are dramatic when compared with the carboxymethyl cellulose gel in the anode formulation. After about 35 minutes, the anode formulated with carboxymethyl cellulose had expanded about 1.5 inches compared with an expansion of only 0.4 inch for the polyacrylamide anode formulation. After about 50 minutes charging time, the carboxymethyl cellulose cell shorted out whereas the polyacrylamide anode did not expand appreciably over 0.4 inch after 90 minutes of abuse charging.

FIG. 5 shows the cell voltage readings obtained during the 1000 MA charge test on the cells employed in connection with FIG. 4. The voltage results confirm that less gas is generated in the cell containing the polyacrylamide composition as compared with the cell containing the carboxymethyl cellulose anode formulation. This, of course, means that the cell with the novel anode composition is less likely to rupture than those containing the conventional carboxymethyl cellulose anode compositions.

A number of sealed "raw" "D" size cells (lacking outer jacket and false covers) were constructed half of which contained the anode composition of the present invention while the other half contained an anode composition comprising carboxymethyl cellulose (CMC).

The formulation for each type was the same as that employed in connection with FIGS. 4 and 5. Three cells of each type were evaluated as to the amount of leakage when 150 MA charge current was passed through each cell. The voltage, charge current, charge time and average bottom bulge was recorded. All cells were fitted with non-resealable safety pressure release valves, but only the CMC cells activated their valves to release gas and liquid. The average data for three cells of the same type were calculated and the results are indicated in Table I below:

TABLE I

| Cell Anode | Current (Milliamps) | Open Circuit Volts | Time (Hrs.) | Average Bulge (Mils.) | External Leakage |
|---|---|---|---|---|---|
| CMC[1] | 150 | 1.57 | 24 | 108 | Very heavy |
| PAM[2] | 150 | 1.55 | 24 | 57 | None |

[1]Carboxymethyl cellulose
[2]Polyacrylamide

A number of "D" size alkaline-zinc-manganese dioxide cells were made containing the anode formulation of the invention as used in connection with cells of FIG. 4. These cells were compared with standard factory "D" size alkaline-zinc-manganese dioxide cells which contain 50 per cent higher mercury. Three fresh cells of each type were evaluated for service in minutes under a 2.25 ohm continuous test at specified cut-off voltages. All cells were non-vented except for safety pressure release valves. The anode of the present invention was also tested in cells which had been charged at 150 MA for 24 hours. Factory cells give little service following such charge. The results are indicated in Table II.

TABLE II

| Type | Cut Off Voltage | | | | | | Anode % Eff. to .65 | State of Cell |
| | 1.2 | 1.1 | 1.0 | 0.9 | 0.8 | 0.65 | | |
|---|---|---|---|---|---|---|---|---|
| Factory[2] | 125 | 300 | 580 | 730 | 780 | 820 | 50 | Fresh |
| PAM[1] | 105 | 300 | 570 | 800 | 940 | 1050 | 68 | Fresh |

TABLE II – Continued

| Type | 1.2 | 1.1 | Cut Off Voltage 1.0 | 0.9 | 0.8 | 0.65 | Anode % Eff. to .65 | State of Cell |
|---|---|---|---|---|---|---|---|---|
| Factory[2] | — | — | — | — | — | 30 845 | 2 | After charge |
| PAM[1] | 120 | 270 | 550 | 765 | 810 | | 62 | After Charge |

[1]Polyacrylamide anode
[2]CMC anode

A modification of the formula given previously for the anode mixture is as follows:

50.0 per cent zinc particles
2.0 per cent HgO powder
2.0 per cent ZnO powder
2.5 per cent polyacrylamide granules
43.5 per cent of electrolyte (35% aqueous KOH solution)

This formula is preferred because the increased content of zinc gives increased service on discharge, and the ZnO in solution further reduces bulging as is discussed later. In keeping with conventional practice, up to 5.0 cc of aqueous KOH electrolyte is added to the separator of a size "D" cylindrical cell, for example, before the anode is dispensed into the cell. This "prewet" addition insures that electrolyte wetting equilibrium is quickly established without drying out the anode mix.

As will be evident from the foregoing, the improved anode structure of the present invention is clearly superior in abuse resistance to anode structure containing gelled carboxymethyl cellulose. Advantageously, a high liquid content anode mixture physically resembles a dry powder and moreover, by virtue of the "voids" created by the novel arrangement, any gas generated is not entrapped in the anode. In addition, there is little or no syneresis of electrolyte thereby assuring anode stability and full service.

Electrolyte which is free to move about may be unavailable to the anode when needed and may interfere with the proper operation of a resealable vent even to the point of exhibiting external leakage. Some commercial anodes, not of the type contemplated herein, utilize compressed zinc powder anodes with absorbed and excess electrolyte which is free to move under the influence of gravity or anodically generated gas. The anode of the present invention is believed to possess the advantages of both the pressed powder anode and the homogeneous gel anode while overcoming or avoiding the disadvantages of each.

A further capability of this new anode not previously mentioned has to do with its unique structure in relation to gas recombination. Alkaline-zinc-manganese dioxide primary cells when subjected to abuse charging will, if fresh, go into what would be termed "overcharge" in a secondary cell. The normal roles of anode and cathode are interchanged because of the reversed current flow, and consequently hydrogen gas is evolved on the zinc electrode and oxygen gas on the manganese dioxide electrode. This process drives the cell voltage up well above the water decomposition voltage, develops gas pressure in the cell, and in the case of prior art anodes leads to swelling of the zinc anode. If the electrolyte contains zinc ions in solution, as by partial cell discharge or by deliberate dissolution of zinc oxide in fresh electrolyte, zinc will be plated out of solution (i.e. charged) and the hydrogen evolution will be suppressed.

Oxygen evolution continues, however, and this must be dealt with. It has been found that the new anode structure by virtue of its porosity (voids) and the accessibility of wetted zinc powder on the surface of the nuggets is ideally constituted to favor chemical recombination of oxygen gas with the zinc powder to form zinc oxide which in turn dissolves in the electrolyte. The cell gas pressure is therefore that pressure which is due to oxygen only and is high enough to drive the chemical recombination of oxygen fast enough to keep up with the electrochemical evolution by charging. If this equilibrium pressure is below that at which the resealable vent opens no external venting of gas will occur. An indication of the pressure is evidenced however by the bulging of the cell container.

This is the significance of the bulge data previously presented in Table I. The reduction in cell voltage on charge by elimination of hydrogen evolution has been also previously shown in FIG. 5. The new anode structure, then, permits full and successful utilization of the known benefits of dissolving a few percent of zinc oxide in fresh cell alkaline electrolyte.

A surprising characteristic of the new anode is the high electronic conductivity achieved by the point to point contact of wetted zinc particles residing on the surface of the nuggets. Despite the void structure and the uncompressed state of the zinc powder, cell amperage attained with the new anode even after 6 months on 45°C. shelf storage is stabilized at about 65% of that routinely obtained from commercial cells of the same size using the gelled carboxymethylcellulose anode. This amperage is satisfactory for virtually all known applications for this type of primary cell. Amperage of freshly made cells is about the same for the two types of anode.

The novel, electrolyte-repellent membrane and resealable vent previously described may be used to advantage in any alkaline-zinc-manganese dioxide cell, as well as other alkaline cells. However, under certain conditions the membrane may become "blinded" and will rupture under pressure. This could occur by severe expansion of the conventional gelled anode on abuse charging, or it could occur with the pressed powder, free electrolyte type of anode on abuse charge in the the inverted cell position.

Similarly the improved, non-swelling anode of the invention may be used to advantage in alkaline cells, particularly alkaline-zinc-manganese dioxide cells of otherwise conventional construction, seal, and finish. Despite the improved anode such cells, if lacking a resealable vent, may rupture their seal and become unusable if overly abused because of the high gas pressure. The addition of a conventional resealable vent will prevent rupture, but may still show external "salting", a sticky or malfunctioning vent, and shortened life. The reason is that copious gassing will cause electrolyte spray or mist which if vented will pass through the vent and deposit liquid on the valve seat and disc. To prevent this the electrolyte repellent membrane must be employed. Clearly, for top cell performance under all conditions the novel anode of the invention should be combined with the resealable vent and electrolyte repellent membrane.

It should be noted that the novel cell of the invention offers cost and environmental protection advantages as well. It is feasible in this cell to use unscreened zinc particles as made rather than screened fractions with the fines (e.g. 200–325 mesh and finer) removed. Zinc fines are notorious in the art for their high gassing rate, and previous cells could not accommodate this much gas. Zinc powder as made is of course much cheaper than screened zinc particles.

Similarly, a reduction in mercury content is possible. Prior art alkaline manganese dioxide cells for example have employed up to three times as much mercury (oxide) in the anode to control wasteful anode corrosion and gassing. Formulations disclosed herein employ 1.8 to 2.0% HgO. Even 1.0% HgO is a usable level if extended high temperature storage is not required. Obviously, cells of the invention would constitute a lesser ecological hazard than conventional prior art cells if disposed of improperly.

When all of the improved features were incorporated in the novel cell of the present invention utilizing in different instances resealable vents as described in FIGS. 1 and 2, the results obtained showed very little expansion of the composite anode and very insignificant or no crusting was observed on the top portion of the venting orifice. Post-discharge cell rupture and leakage was substantially eliminated. The combination of the composite anode with the venting structure in an alkaline galvanic cell provides a cell which is superior to similar type cells now available to the art.

It should be understood that electrolyte, in addition to that absorbed in an anode structure, will also be absorbed in the separator and cathode, and additional electrolyte may, if desired, be present in other absorbents, reservoirs, cavities, and the like.

It will of course, further be understood that many variations, changes and modifications of the development described herein can be made without departing from the spririt and scope of the invention.

What is claimed is:

1. An improved alkaline galvanic cell which comprises, in combination a cell container, an anode chamber and a cell closure for said cell container, venting means including a venting orifice in said closure defining a conduit for the passage of gas from said anode chamber, said venting orifice having a top portion and a bottom portion, a pressure movable resealable venting valve member biased into sealing position on the top portion of said orifice and gas-permeable, liquid-impermeable membrane disposed on the bottom portion of said venting orifice, said anode chamber including a composite anode containing zinc particles, an alkaline electrolyte and cross-linked polyacrylamide, wherein said alkaline electrolyte is absorbed in said cross-linked polyacrylamide to form electrolyte nuggets and wherein said zinc particles are wetted with electrolyte and are distributed throughout said composite anode in a manner such that said zinc particles are in contacting relation with said electrolyte nuggets and with each other.

2. An improved alkaline galvanic cell according to claim 1 wherein said alkaline galvanic cell is an alkaline-zinc-manganese dioxide cell.

3. An improved alkaline galvanic cell according to claim 2 wherein said composite anode is characterized by a system of interconnectable voids distributed throughout said composite anode.

4. An improved alkaline galvanic cell according to claim 2 wherein said cross-linked polyacrylamide is capable of absorbing at least about 12 times its weight of electrolyte at 100°C.

5. An improved alkaline galvanic cell according to claim 2 wherein said alkaline electrolyte is aqueous potassium hydroxide.

6. An improved alkaline galvanic cell according to claim 2 wherein said alkaline electrolyte is aqueous sodium hydroxide.

7. An improved alkaline galvanic cell according to claim 2 wherein said alkaline electrolyte is a mixture of aqueous potassium hydroxide and aqueous sodium hydroxide.

8. An improved alkaline galvanic cell according to claim 2 wherein said zinc is present in said composite anode in an amount of about 30 to about 85 percent by weight; said alkaline electrolyte is present in an amount of about 10 to about 65 percent by weight and wherein said cross-linked polyacrylamide is present in an amount of about 1 to 8 percent by weight based on the total weight of the composite anode.

9. An improved alkaline galvanic cell according to claim 2 wherein said zinc particles have a particle size which will pass through a 60 mesh screen but be substantially retained on a 325 mesh screen.

10. An improved alkaline-zinc-manganese dioxide cell which comprises, in combination a cell container, an anode chamber and cell closure for said cell container, venting means including a venting orifice in said closure defining a conduit for the passage of gas from said anode chamber, said venting orifice having a top portion and a bottom portion, a pressure movable resealable venting valve member biased into sealing position on the top portion of said orifice and a gas permeable liquid impermeable membrane disposed on the bottom portion of said venting orifice, said anode chamber including a composite anode containing 30 to about 85 percent by weight zinc particles of a particle size of 60 to 325 mesh, an alkaline electrolyte in an amount of 10 to about 65 percent by weight and a cross-linked polyacrylamide, wherein said alkaline electrolyte is absorbed in said cross-linked polyacrylamide to form electrolyte nuggets and wherein said zinc particles are wetted with electrolyte and are distributed throughout said composite anode in a manner such that said zinc particles are in contacting relation with each other and with said electrolyte nuggets, said composite anode being further characterized by a system of interconnectable voids distributed throughout said composite anode.

11. An improved alkaline-zinc-manganese dioxide cell according to claim 10 wherein said polyacrylamide, prior to cross-linking is of the structure:

$$\{[-CH_2-CH(CONH_2)-]_m [-CH_2-CH(COOY)-]_n\} Z$$

where

Y is hydrogen, ammonium or an alkali metal;

m is a positive number from 1 to 100;

n is 0, or a positive number up to 99 which may be regarded as an index of the degree of hydrolysis of $m + n$ amide groups originally present;

$m$ plus $n$ is equal to 100; and

Z is a number from about 0.1 to 30, where Z times 100 is equal to the number of mer units between cross-links.

12. An improved alkaline-zinc-manganese dioxide cell according to claim 11 wherein said polyacrylamide cross-linked with a non-conjugated divinyl compound.

13. An improved alkaline-zinc-manganese dioxide cell according to claim 11 wherein said polyacrylamide is cross-linked with methylene bis acrylamide.

14. An improved alkaline-zinc-manganese dioxide cell according to claim 10 wherein said cross-linked polyacrylamide is formed by the copolymerization reaction of a ratio of 13 to 22 moles of acrylamide monomer per mole of methylene bis acrylamide.

15. An improved alkaline galvanic cell according to claim 2 wherein said pressure movable resealable venting valve member is a disc having a material hardness of 30 to 80 durometer.

16. An improved alkaline galvanic cell according to claim 2 wherein said pressure movable resealable venting valve member is a resilient deformable ball of an elastomeric material having a hardness of about 60 to 70 durometer.

17. An improved alkaline galvanic cell according to claim 2 wherein said gas permeable liquid impermeable membrane has a hydrogen gas permeability flow rate of at least 20,000 cc per hour per square inch at 30 psi differential pressure at 20°C.

18. An improved alkaline galvanic cell according to claim 2 wherein said gas permeable liquid impermeable membrane is fabricated from polypropylene.

19. An improved alkaline galvanic cell according to claim 2 wherein said gas permeable liquid impermeable membrane has a hydrogen gas permeability flow rate of about 40,000 to about 75,000 cc per hour per square inch at 30 psi differential pressure at 20°C.

20. An improved alkaline galvanic cell according to claim 2 wherein said gas permeable liquid impermeable membrane has a liquid penetration differential pressure greater than about 300 psi.

21. An improved alkaline manganese dioxide cell according to claim 10 wherein said pressure movable resealable venting valve member is a disc having a material hardness of 30 to 80 durometer.

22. An improved alkaline manganese dioxide cell according to claim 10 where said pressure movable resealable venting valve member is a resilient deformable ball of an elastomeric material having a hardness of about 60 to 70 durometer.

23. An improved alkaline manganese dioxide cell according to claim 10 wherein said gas permeable liquid impermeable membrane has a hydrogen gas permeability flow rate of at least 20,000 cc per hour per square inch at 30 psi differential pressure at 20°C.

24. An improved alkaline manganese dioxide cell according to claim 10 wherein said gas permeable liquid impermeable membrane is fabricated from polypropylene.

25. An improved alkaline manganese dioxide cell according to claim 9 wherein said gas permeable liquid impermeable membrane is fabricated from polyethylene.

26. An improved alkaline manganese dioxide cell according to claim 10 wherein said gas permeable liquid impermeable membrane has a hydrogen gas permeability flow rate of about 40,000 to about 75,000 cc per hour per square inch at 30 psi differential pressure at 20°C.

27. An improved alkaline manganese dioxide cell according to claim 10 wherein said gas permeable liquid impermeable membrane has a liquid penetration differential pressure greater than about 300 psi.

28. An improved alkaline galvanic cell according to claim 2 wherein said gas permeable liquid impermeable membrane is fabricated from a perhalogenated aliphatic hydrocarbon.

29. An improved alkaline galvanic cell according to claim 2 wherein said gas permeable liquid impermeable membrane has a burst strength below the rupture pressure point of the cell.

* * * * *